Oct. 27, 1970     K. O. CREEK ET AL     3,535,803
DEPTH GAUGE PROBE ASSEMBLY
Filed May 19, 1969     2 Sheets-Sheet 1
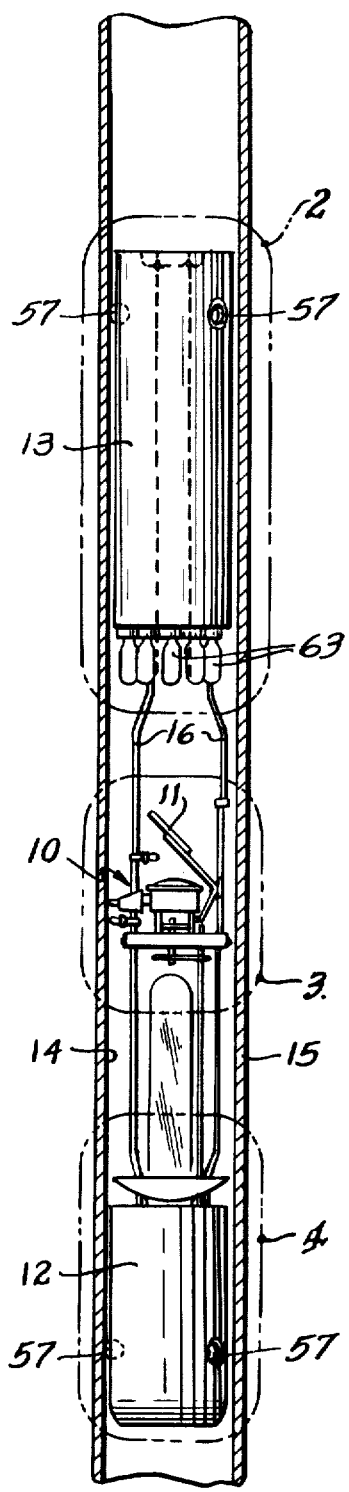
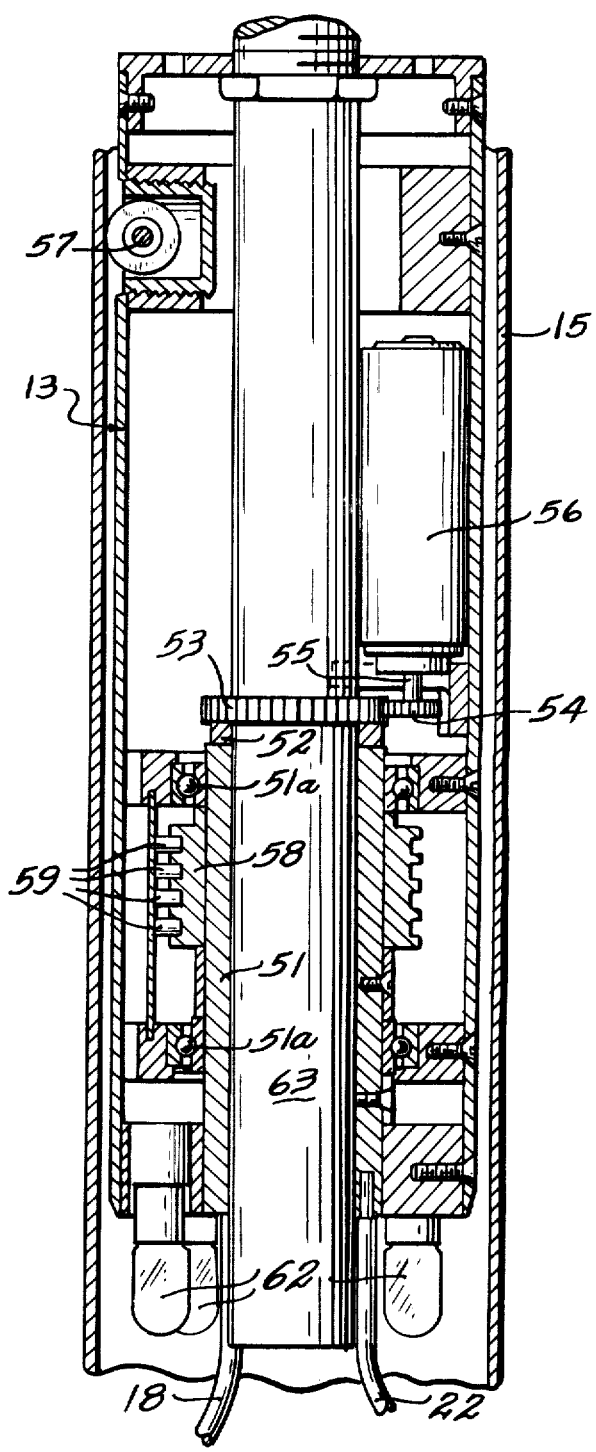
Inventors
Kenneth O. Creek
David W. Leiby
Attorney

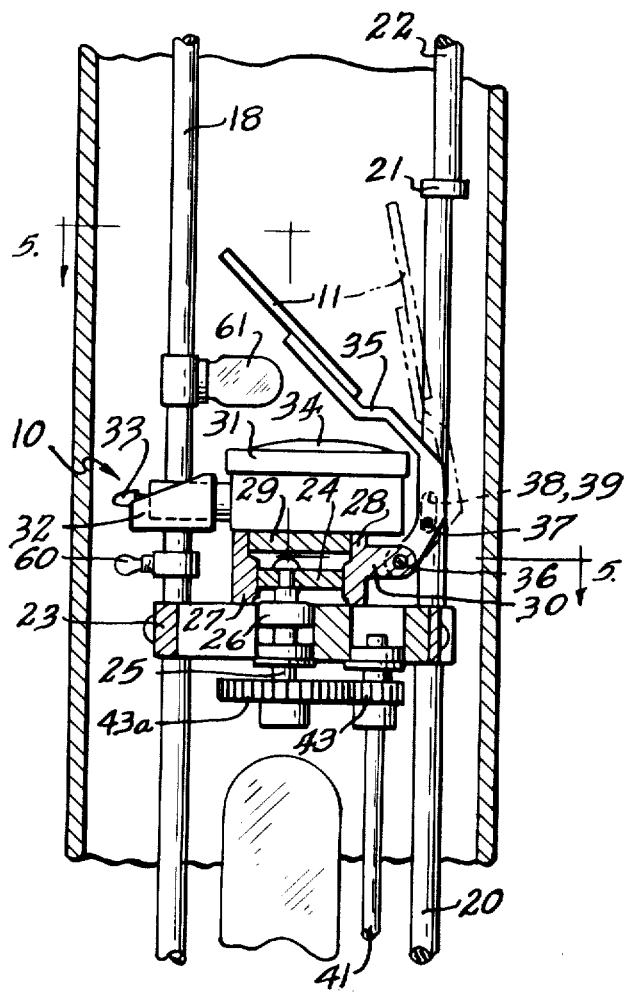
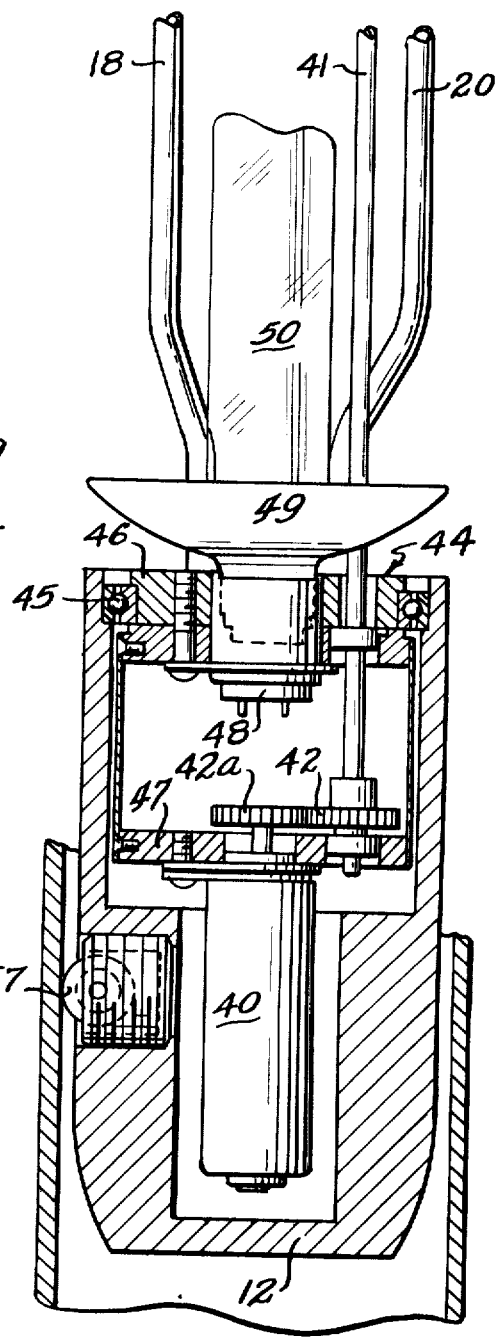
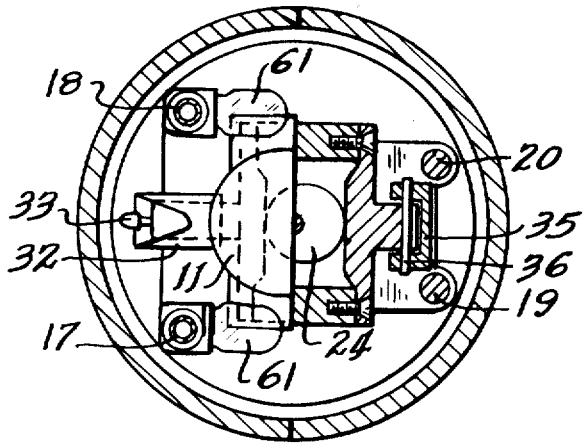

3,535,803
DEPTH GAUGE PROBE ASSEMBLY
Kenneth O. Creek, Richland, Wash., and David W. Leiby, Cincinnati, Ohio, assignors to the United States of America as represented by the United States Atomic Energy Commission
Filed May 19, 1969, Ser. No. 825,892
Int. Cl. G01b 5/20
U.S. Cl. 38—174                    6 Claims

ABSTRACT OF THE DISCLOSURE

A device for viewing and measuring defects within a tube in which a depth gauge and mirror are interconnected so that when the mirror is in position to reflect a portion of the tube interior along the tube axis to a television camera the depth gauge is out of contact with the tube interior and when the depth gauge is in contact with the tube interior the mirror is moved aside to permit viewing of a depth gauge dial. The mirror and depth gauge move simultaneously about the tube axis and also longitudinally of the tube.

CONTRACTUAL ORIGIN OF THE INVENTION

The invention described herein was made in the course of, or under, a contract with the United States Atomic Energy Commission.

BACKGROUND OF THE INVENTION

This invention relates to a device for inspecting and measuring defects in tubes of great length and, more particularly, to a probe for use in nuclear reactor process tubes where personal observation is impractical.

The process tubes of a nuclear reactor are made of highly corrosion resistant material and are tested extensively before insertion into a reactor. The possibility exists, however, that the tubes may become damaged or may deteriorate due to unforeseen circumstances. Once the reactor has been activated, the process tubes become too radioactive to permit close-up personal insepection. A device and method for remotely inspecting such tubes and ascertaining the extent of any damage found are needed. The probe of this invention has been used to examine process tubes 53 feet in length and 2.7" in diameter and measure scratches in the tube wall between 0.00025 and 0.055 inch deep. The probe has absorbed approximately $35 \times 10^6$ roentgens gamma radiation and is still operable.

BRIEF DESCRIPTION OF THE DRAWINGS

The probe of this invention may be better understood by reference to the drawings in which:

FIG. 1 is an elevational view of the probe of this invention within a tube;

FIGS. 2, 3 and 4 are enlarged portions of FIG. 1 partially in section corresponding to the respective circled portions of FIG. 1.

FIG. 5 is a sectional view taken along line 5—5 of FIG. 3.

DETAILED DESCRIPTION OF THE PREFERRED EMBODIMENT

As shown in FIG. 1, the device of this invention comprises a depth gauge assembly 10 connected to a mirror 11 situated between two support assemblies 12 and 13. The depth gauge assembly 10 and mirror 11 are movable between a first position in which the depth gauge assembly is spaced from the interior surface 14 of a tube 15 while the mirror is obliquely intersected by the tube axis and a second position in which the mirror is spaced from the tube axis while the depth gauge assembly is in contact with the tube interior, see the dotted line position in FIG. 3 for the second position of the mirror. The depth gauge assembly 10 and mirror 11 are connected to support assemblies 12 and 13 by means of a frame 16, and the frame as well as the mirror and depth gauge assembly can be simultaneously rotated about the tube axis. The entire device, including support assemblies 12 and 13, is movable longitudinally of the tube axis.

As shown in FIGS. 1 and 5, frame 16 consists of two hollow parallel tubes 17 and 18 terminating at either end in support assemblies 12 and 13 and two parallel solid rods 19 and 20 terminating at one end in support assembly 12 and at the other end in "T" 21; a single solid rod 22 connects the "T" to support assembly 13. The spaced relationship of tubes 17 and 18 and rods 19 and 20 is maintained by the support assemblies 12 and 13 and a support plate 23 (see FIG. 3). With reference to FIGS. 3 and 5, a cam 24, eccentrically mounted on one end of spindle 25, is fixed with respect to support plate 23 by a bushing 26. Two parallel cam followers 27 and 28 are maintained in contact with cam 24 by crosspiece 29; cam follower 28 has a transverse part 30. A dial 31 is fixed to crosspiece 29 and cam followers 27 and 28. Connected to dial 31 is a reference sleeve 32 housing a spring-loaded stylus 33. Dial face 34 shows the displacement of stylus 33 with respect to reference sleeve 32.

A curved mirror arm 35 is connected at one end to part 30 of cam follower 28 by dowel rod 36 and at the other end arm 35 is attached to mirror 11. Mirror arm 35 has a roll pin 37 attached to that part of the arm which is parallel to rods 19 and 20 when the mirror 11 is in its first (full line) position. The roll pin 37 fits into slots 38 and 39 in rods 19 and 20 respectively; the slots have their longitudinal axis parallel to the longitudinal axis of tube 15 and their length is related to the movement of stylus 33 from its first position to its second position, as will be later explained.

With reference to FIGS. 3 and 4, rotation of cam 24 is provided by means of motor 40, shaft 41 and two sets of meshing gears 42, 42a and 43, 43a at either end of the shaft; gear 43a is connected to the other end of spindle 25 opposite cam 24. Motor 40 is connected to a spacer tube assembly 44 that is rotatable with respect to support assembly 12, as will later be explained; bearings 45 provide for reduced friction between the support assembly and the spacer tube assembly. Spacer tube assembly 44 contains a base plate 46 and a motor mount 47 parallel to plate 46 and spaced therefrom. Motor 40 is mounted on motor mount 47, while base plate 46 houses a lamp socket 48 and the plate also receives the component parts of frame 16. Connected to socket 48 are a light reflector 49 and a lamp bulb 50.

Referring now to FIGS. 2 and 3, the components of frame 16 are connected to spacer tube 51 which rotates with respect to support assembly 13, as will later be explained; bearings 51a provide for reduced friction between the support assembly and the spacer tube. A collar 52 connects spacer tube 51 with an annular gear 53. A drive gear 54 which meshes with annular gear 53 is mounted on the drive shaft 55 of motor 56. Rotation of drive shaft 55, therefore, rotates not only spacer tube 51, but also frame 16 and spacer tube assembly 44. Longitudinal movement of the entire device, provided by ram means (not shown), is aided by a plurality of roller assemblies 57, three of which are spaced evenly about support assembly 12 and three of which are spaced evenly about support assembly 13.

Electrical power is supplied to motor 40 and lamp bulb 50 by means of a slip ring 58, located on but insulated from spacer tube 51, in electrical contact with brushes 59. Brushes 59 remain stationary when spacer tube 51 rotates and transmit electricity from a source (not shown) to the slip ring 58 which rotates concurrently with the spacer tube. Current is collected from the slip ring 58 and fed via wires (not shown) through hollow tubes 17 and 18 to motor 40 and lamp socket 48. Referring also to FIG. 3, a pair of lamp assemblies 60 are mounted on hollow tubes 17 and 18 between stylus 33 and support plate 23 to better illuminate the stylus, and a pair of lamp assemblies 61 are also mounted on the hollow tubes between the dial face 34 and the mirror 11 to better illuminate the dial face; these assemblies also receive their power supply from the wires within the hollow tubes. Electrical power can be directly supplied to motor 56 without resort to brushes and slip rings and also power can be directly supplied to a plurality of lamps 62 housed in the support assembly 13 about the periphery of spacer tube 51. A television lens 63 extends through annular gear 53 and spacer tube 51 to a point intermediate lamps 62 and mirror 11.

In operation, the entire device is inserted into a tube 15 by means (not shown) which move the device longitudinally within the tube. The device is positioned within the tube 15 so that when mirror 11 is in its first position and obliquely intercepted by the tube axis, the point to be inspected on the interior surface 14 is intersected by a line perpendicularly intercepting the tube axis at the mirror. Therefore, a region of the interior surface 14 surrounding the point to be inspected is reflected in mirror 11 when the mirror is in its first position. Since the television lens 63 is positioned along the tube axis, the region around the point to be inspected is reflected by mirror 11 to the lens which transmits the image so received to a console or viewing screen (not shown). Complete inspection of tube 15 is obtained by a combination of longitudinal movement of the mirror 11 within the tube and rotational movement about the tube axis provided by motor 40.

In general, both longitudinal and rotational movement of the device is accomplished with both the mirror 11 and depth gauge assembly 10 in their respective first positions, that is, the mirror is obliquely intercepted by the tube axis and the gauge is spaced from the interior surface 14 of tube 15, in order to prevent excessive wear on stylus 33 of the depth gauge assembly.

If a scratch or other defect in tube 15 is noted and it is desired to measure the depth of the imperfection, then motor 56 is activated to rotate the depth gauge assembly 10 until it is positioned over the imperfection. Once the depth gauge assembly 10 is in position to measure the imperfection, then the mirror 11 and depth gauge assembly are caused to simultaneously assume their second positions in which the mirror is spaced from the tube axis and the stylus 33 is in contact with the tube interior surface 14.

Movement of the depth gauge assembly 10 and mirror 11 from their first positions to their second positions is accomplished by means of motor 40. Upon activation of motor 40, cam 23 rotates by means of the connection hereinbefore described between the cam and the motor. Since cam 24 is eccentrically mounted on spindle 25 and the spatial relationship between cam followers 27 and 28 is fixed by crosspiece 29, rotation of the cam causes movement of the cam followers, hence depth gauge assembly 10, transverse to the tube axis. Cam 24 is so sized that upon rotation thereof stylus 33 comes in contact with interior surface 14 of tube 15. Since mirror arm 35 is connected to cam follower 28, it must move when the support moves. As shown in FIG. 3, slots 38 and 39 in combination with roll-pin 37 provide for movement of mirror 11 from the full-line position, corresponding to its first position, to the dotted line position, corresponding to its second position; the slots are sufficiently long to allow free movement of the mirror.

When mirror 11 and depth gauge assembly 10 are in their respective second positions, dial face 34 is in view of television lens 63 unobstructed by mirror 11. The dial face 34 reflects the position of stylus 33 with respect to reference sleeve 32. A dial reading is ascertained for the position of stylus 33 with respect to sleeve 32 when the sleeve and stylus are in contact with an undamaged portion of surface 14. The depth of any imperfections is the difference between the new reading and the reference reading. Imperfections 0.25 mil deep are accurately measured by the device of this invention. The principal illumination within tube 15 is derived from lamp bulb 50 and lamps 62. Reflector 49 helps diffuse light throughout tube 15 for more uniform lighting. In order to reduce glare, television lens 63 is positioned beyond lamps 62 and any reflecting metal surfaces on the probe may be painted black.

It should be stated that as the lamps are exposed to radiation, the glass turns brown. Increasing the voltage to the lamp results in a temperature rise which anneals the glass and reduces the brown discoloration. Any damage to interior surface 14 shows up in the television console as a bright spot on tube 15.

The embodiments of the invention in which an exclusive property or privilege is claimed are defined as follows:

1. A device for inspecting the interior of a tube and measuring defects in said interior comprising: a depth gauge movable transversely to the tube axis between a first position in which the gauge is spaced from the tube interior and a second position in which it contacts the tube interior;

a mirror movable between a first position in which said mirror is obliquely intersected by the tube axis and reflects therealong a region of the interior surrounding a point thereon at which the interior is intersected by a line perpendicularly intersecting the tube axis at the mirror and a second position in which said mirror is spaced from the tube axis;

means interconnecting the depth gauge and the mirror for causing them to assume their first positions simultaneously and to assume their second positions simultaneously;

means for moving said depth gauge and mirror longitudinally within the tube; and means for rotating said depth gauge and mirror about the tube axis.

2. The device of claim 1 wherein the means interconnecting the depth gauge and mirror comprise:

a slotted frame substantially parallel to the tube axis and fixed with respect to movement transverse to the tube axis;

an arm connected to said mirror, said arm having a roll pin therein in sliding relationship with said slot in said frame;

a pair of cam followers fixed to the depth gauge, one of said followers being connected to the mirror arm;

a cam between said cam followers; and means for rotating said cam which results in simultaneous movement of the cam followers transverse to the tube axis and movement of the mirror arm.

3. The device of claim 2 wherein the depth gauge comprises a movable stylus, a reference sleeve and a dial which reflects the position of the stylus with respect to the reference sleeve.

4. The device of claim 3 wherein the dial is connected to the cam followers so that said dial moves coincident with movement of the cam followers transverse to the tube axis.

5. The device of claim 4 wherein the slotted frame is connected at either end thereof to first and second cylinders, said cylinders being adapted to rotate with said frame, said first cylinder housing said means for rotating said depth gauge and mirror about the tube axis and said second cylinder housing means for rotating said cam which results in said mirror and depth gauge assuming their first positions simultaneously and assuming their second positions simultaneously.

6. The device of claim 5 and further comprising means for illuminating said mirror and said dial and means housed within said first cylinder for viewing said mirror and said dial.

References Cited

UNITED STATES PATENTS 2,587,476 2/1952 Huhn.
2,721,110 10/1955 Price.

SAMUEL S. MATTHEWS, Primary Examiner